United States Patent Office 3,816,528
Patented June 11, 1974

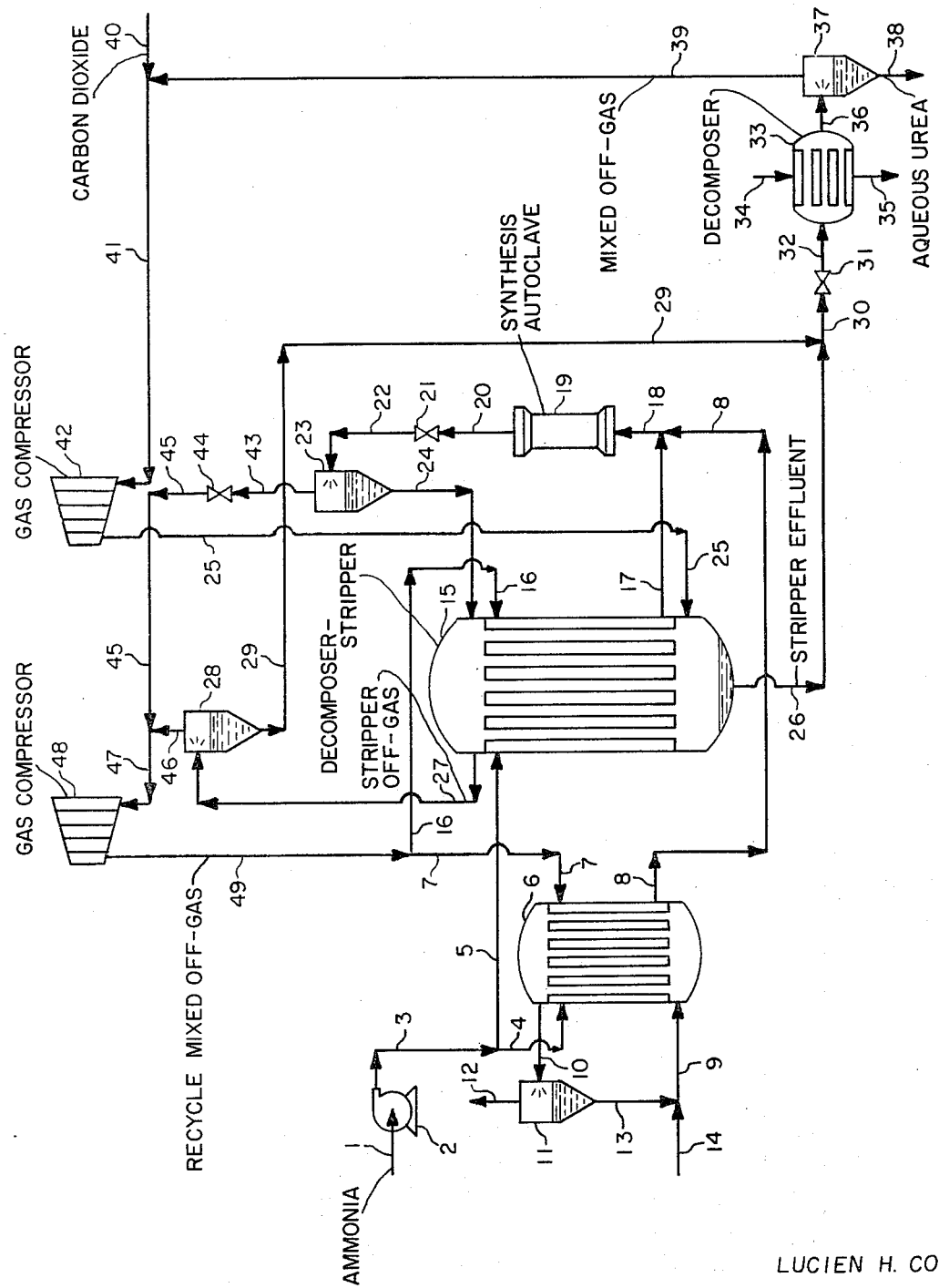

3,816,528
UREA SYNTHESIS PROCESS
Lucien H. Cook, Port Washington, N.Y., assignor to Chemical Construction Corporation, New York, N.Y.
Filed Nov. 16, 1970, Ser. No. 89,754
Int. Cl. C07c 127/00
U.S. Cl. 260—555 A  6 Claims

ABSTRACT OF THE DISCLOSURE

A urea synthesis process employing ammonia and carbon dioxide as feed reactants, in which mixed off-gas derived from ammonium carbamate decomposition is compressed together with feed carbon dioxide to urea synthesis pressure and reacted exothermically with feed ammonia while in heat exchange with urea synthesis effluent stream, which is concomitantly stripped with intermediate pressure recycle mixed gas.

BACKGROUND OF THE INVENTION

Field of the invention

The invention relates to the high pressure synthesis of urea from ammonia and carbon dioxide, in a process in which unconverted reactants are evolved in a mixed off-gas which is compressed and recycled to urea synthesis in the gaseous states.

Description of the prior art

Recycle of mixed off-gas, derived from ammonium carbamate decomposition in urea synthesis, to the urea synthesis reactor in the gaseous state, generally by adiabatic compression in centrifugal compressors, has been described in U.S. Pats. Nos. 3,200,148; 3,232,985; 3,301,897 and 3,370,090, and British Pat. No. 1,129,787. In these processes, the heat generated by off-gas condensation and ammonium carbamate formation during urea synthesis has been removed by heat exchange with water to generate steam. Heat exchange between reacting process feed streams of ammonia and carbon dioxide, and the effluent stream from urea synthesis, so as to decompose ammonium carbamate, is described in French Pat. No. 958,503. The stripping of ammonium carbamate from the urea synthesis effluent using feed carbon dioxide is described in U.S. Pat. No. 3,356,723.

SUMMARY OF THE INVENTION

In the present invention, a urea synthesis process is provided in which gaseous feed carbon dioxide is added to a mixed off-gas derived from decomposition of ammonium carbamate, and the resultant recycle gas stream rich in carbon dioxide is compressed to urea synthesis pressure and reacted with compressed liquid ammonia so as to form ammonium carbamate in a highly exothermic reaction, which takes place in heat exchange with the urea synthesis effluent stream, so as to decompose unconverted ammonium carbamate in the reduced pressure synthesis effluent stream, which is concomitantly stripped with lower pressure mixed off-gas. The resultant synthesis effluent stream is passed to further processing to recover product urea, while the liquid melt resulting from the high pressure exothermic reaction of feed ammonia with compressed mixed off-gas is passed to the urea synthesis reactor for retention under urea synthesis conditions, to form further urea synthesis effluent melt.

The principal advantage of the invention is that heat or steam consumption and utility requirements for cooling water and electric power are reduced, due to direct heat exchange between the process streams in the improved combination procedure. Another advantage is that biuret formation during the decomposition of ammonium carbamate in the urea synthesis effluent melt is reduced. A further advantage is that most of the ammonium carbamate is stripped and removed from the synthesis effluent stream at high pressure in a mixed off-gas, which is readily recompressed to urea synthesis pressure, thus reducing compression costs and equipment sizes. Another advantage is that capital costs for the facility are reduced since less equipment is required.

An object of the present invention is to provide an improved process for the synthesis of urea from ammonia and carbon dioxide.

Another object is to provide an improvement in urea synthesis processes in which mixed off-gas is compressed and recycled to urea synthesis in the gaseous state.

A further object is to reduce heat consumption, utility requirements and capital costs for a urea synthesis facility.

An additional object is to decompose and remove ammonium carbamate from a urea synthesis effluent stream in an improved manner.

Still another object is to provide an improved heat recovery sequence in urea synthesis.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. Liquid ammonia stream 1 is pressurized by pump 2 to urea synthesis pressure and discharged via stream 3 at a pressure generally in the range of 150 kg./sq. cm. to 350 kg./sq. cm. Stream 3 is preferably divided into streams 4 and 5, and the flow rate of stream 4 is usually less than 50% of the stream 3 flow rate. Stream 4 is passed into the shell of heat exchanger 6, in which low pressure steam is generated. Recycle high pressure mixed off-gas stream 7 rich in carbon dioxide is also passed into the shell of unit 6 and reacts with stream 4 to form ammonium carbamate in a highly exothermic reaction which yields a hot condensed liquid melt rich in ammonium carbamate at a temperature generally in the range of 150° C. to 220° C., which is removed from the lower portion of the shell of unit 6 via stream 8 and passed to urea synthesis as will appear infra.

Liquid condensate water or boiler feed water stream 9 is passed into the lower end of unit 6 and flows upwards through the tubes of unit 9 and is heated, with at least a portion of the liquid water being vaporized to steam in the tubes of unit 6. The resultant mixture of steam and residual liquid water is removed from the upper end of unit 6 via stream 10, which passes into steam-water separator vessel 11, in which the separation of the vaporized steam from liquid water takes place. Unit 11 is a cyclonic or baffled vessel of conventional design for the separation of gaseous and liquid phases. The resultant saturated steam stream 12 is removed from unit 11 at a pressure typically in the range of 2 kg./sq. cm. to 10 kg./sq. cm., and stream 12 is passed to suitable process usage as heating steam. The separated liquid water is removed from unit 11 via stream 13, which is combined with make-up condensate water or boiler feed water stream 14 to form stream 9.

The balance of the pressurized liquid feed ammonia flows via stream 5 into the shell of heat exchanger 15, which is a combined decomposer and stripper in which ammonium carbamate in the urea synthesis effluent melt is decomposed by heating and stripped from the melt by mixed off-gas. Recycle high presusre mixed off-gas stream 16 rich in carbon dioxide is also passed into the shell of unit 15 and reacts with stream 5 to form ammonium carbamate in a highly exothermic reaction which yields a hot condensed liquid melt rich in ammonium carbamate at a temperature generally in the range of 150° C. to 220° C., which is removed from the lower portion of the shell of unit 15 via stream 17 and combined with stream 8 to form stream 18, which is passed to urea synthesis in autoclave or reactor 19, in which a pressure typically in the range of 150 kg./sq. cm. to 350 kg./sq. cm. and a temperature typically in the range of 150° C. and 220° C. are maintained, to attain urea synthesis by the dehydration of ammonium carbamate. An overall molar ratio of total free and combined ammonia to combined carbon dioxide in the range of 2:1 to 6:1 is maintained within unit 19, and the resultant urea synthesis effluent stream 20 discharged from unit 19 at a pressure in the range of 150 kg./sq. cm. to 350 kg./sq. cm. is a melt which principally contains urea, unconverted ammonium carbamate, excess ammonia and water.

Stream 20 is passed through pressure reducing valve 21, and the resulting stream 22, now at a reduced pressure typically in the range of 35 kg./sq. cm. to 140 kg./sq. cm., contains a spontaneously evolved mixed gaseous phase, which is removed from the liquid synthesis effluent by passing stream 22 into the gas-liquid separator 23. Unit 23 is a baffled or cyclonic unit of conventional design for the separation of gaseous and liquid phases from a mixed fluid stream. The separated liquid phase is removed from unit 23 via stream 24, which principally contains product urea, water, ammonium carbamate and excess ammonia. Stream 24 is now processed in accordance with the present invention, to decompose and remove most of the contained ammonium carbamate.

Stream 24 is passed into the upper end of unit 15 and flows downwards through the tubes of unit 15 and is heated by indirect heat exchange with the process streams 5 and 16 which are reacting in the shell of unit 15 as described supra. The heating of stream 24 in the tubes of unit 15 attains ammonium carbamate decomposition, and usuallly a major portion of between 50% to 90% of the ammonium carbamate originally present in stream 24 is decomposed in the tubes of unit 15, to generate a mixed off-gas. The tubes of unit 15 are generally vertically oriented, so that the liquid phase stream 24 flows down the walls of the tubes as thin liquid or falling films, and the evolved off-gas rises through the tubes of unit 15 countercurrent to the downflowing liquid phase. A hot intermediate pressure mixed off-gas stream 25 is concomitantly admitted into the lower end of unit 15 and rises through the tubes of unit 15. Stream 25 is a mixed off-gas at a pressure in the range of 35 kg./sq. cm. to 140 kg./sq. cm. and rich in carbon dioxide, and the rising gas phase in the tubes of unit 15 serves to strip ammonium carbamate from the downflowing liquid phase. A heated and stripped residual liquid phase is collected in the bottom of unit 15 and removed via stream 26, which now principally consists of an aqueous urea solution containing a minor residual proportion of ammonium carbamate.

Returning to the top of unit 15, a resultant mixed off-gas containing ammonia, carbon dioxide and water vapor as well as entrained liquid droplets is removed from the top of unit 15 via stream 27, which passes to an entrainment separator 28 which may be similar in configuration to unit 23. Unit 28 serves to remove the entrained liquid phase from stream 27, and the separated liquid is removed from unit 28 via stream 29, which is combined with stream 26 to form stream 30. Liquid stream 30 containing product urea in aqueous solution is now processed in any suitable manner to decompose residual ammonium carbamate and produce a low pressure mixed off-gas and product aqueous urea solution.

Stream 30 is typically passed through pressure reducing valve 31 to produce stream 32 at a reduced pressure typically in the range of 3 kg./sq. cm. to 30 kg./sq. cm. Stream 32 is heated in decomposer 33 by heat exchange with steam stream 34 which is thereby condensed and removed from unit 33 as condensate stream 35. The resultant heated process stream 36, now containing an evolved mixed off-gas phase, passes to separator 37 which is generally similar in configuration to unit 23. The separated liquid phase is removed via stream 38, which now consists of an aqueous urea solution containing minor residual proportions of ammonia and carbon dioxide. Stream 38 is now processed by means not shown, to produce product urea solution or solid urea by evaporative concentration followed by crystallization, prilling, or the like.

A low pressure mixed off-gas stream 39 is removed from separator 37, and stream 39 is combined with feed carbon dioxide stream 40 to form mixed off-gas stream 41 rich in carbon dioxide, which is compressed in gas compressor 42 to form stream 25. Unit 42 preferably consists of a substantially adiabatic type of centrifugal compressor, and stream 25 is discharged from unit 42 at a pressure in the range of 35 kg./sq. cm. to 140 kg./sq. cm. and temperature in the range of 100° C. to 220° C. Stream 25 typically contains, in volume percent, about 40% to 80% carbon dioxide, balance ammonia and water vapor.

Returning to separator unit 23, the mixed off-gas stream 43 rich in ammonia is removed from unit 23 at a pressure in the range of 35 kg./sq. cm. to 140 kg./sq. cm. and passed through pressure reducing control valve 44. The gas stream 45 discharged from valve 44 is at a slightly lower presure than stream 43, a typical increment of pressure reduction being 1 kg./sq. cm. to 2 kg./sq. cm. Stream 45 is combined with the mixed off-gas stream 46 discharged from separator 28. Stream 46 is rich in carbon dioxide, and the resultant combined mixed off-gas stream 47 formed by the combination of streams 45 and 46 also is high in carbon dioxide content derived originally from stream 40. Stream 47 is compressed to urea synthesis pressure in compresser 48, which is generally similar in configuration to unit 42. The hot compressed mixed gaseous stream 49 discharged from unit 48 is typically at a pressure in the range of 150 kg./sq. cm. to 350 kg./sq. cm. and a temperature in the range of 100° C. to 220° C. Stream 49 is divided into streams 7 and 16, with the flow rate of stream 7 generally being less than 50% of the flow rate of stream 49.

Numerous alternatives within the scope of the present invention will occur to those skilled in the art. The ranges of temperature and pressure enumerated supra constitute a preferred embodiment of the invention for optimum utilization of the procedural concepts of the invention, and the invention may be practiced outside of these ranges in suitable instances. Unit 6 and its function may be omitted in some instances, in which case all of stream 3 would flow via stream 5 to unit 15 and all of stream 49 would flow via stream 16 to unit 15. In some instances, stream 34 will be derived from stream 12. The separator unit 28 may be replaced in some cases by an internal entrainment separator within the upper end of unit 15, in which case stream 29 would be omitted, and all of stream 27 would be directly combined with stream 45 to form stream 47. In instances when a low molar ratio of ammonia to carbon dioxide in unit 19 of less than about 4:1 is provided, unit 23 and its function may be omitted, with all of stream 22 flowing via stream 24 and stream 47 being derived solely from stream 46 or stream 27. Various pressure and level control valves and other control instruments have been omitted from the description in the interest of clarity, and these control instruments and means will be provided in practice of the invention in commercial facilities. More than two stages of ammonium carbamate decomposition at successively decreasing pressure levels may be provided in some cases, and the lower pressure decomposition stages may entail the provision of distillation columns with reboilers, vertically oriented heat exchange decomposers with upwardly flowing stripping gas rich in carbon dioxide and similar in composition to stream 41, etc.

An example of industrial application of the process of the present invention will now be described.

Example

The process of the present invention was applied to the design of a 1000 metric tons per day urea plant. Following are the flow rates and operating conditions for principal process streams.

| Stream number | Temp., °C. | Absolute pressure, kg./sq. cm. | Component flow rate, kg./hr. | | | | |
|---|---|---|---|---|---|---|---|
| | | | Ammonia | Carbon dioxide | Water | Urea | Inerts |
| 1 | 38 | 22.2 | 24,062 | | | | |
| 40 | 38 | 1.2 | | 31,702 | | | 73 |
| 49 | 227 | 204 | 30,400 | 56,500 | 6,730 | | 152 |
| 20 | 193 | 204 | 30,500 | 25,400 | 19,400 | 42,200 | 152 |
| 47 | 171 | 73.8 | 30,400 | 56,500 | 6,730 | | 152 |
| 26 | 171 | 77.4 | 4,580 | 3,800 | 16,180 | 42,200 | 152 |
| 25 | 226 | 77.4 | 4,440 | 34,800 | 3,480 | | 152 |
| 30 | 159 | 8.1 | 4,140 | 3,110 | 16,000 | 42,200 | |
| 41 | 127 | 1.2 | 4,440 | 34,800 | 3,480 | | 152 |
| 38 | 121 | 1.8 | 133 | 722 | 12,700 | 42,200 | |

In this example, 40% of each of streams 3 and 49 passed to unit 6 via streams 4 and 7 respectively, and the remaining 60% of each of streams 3 and 49 passed to unit 15 via streams 5 and 16 respectively. The overall molar feed ratio of ammonia to carbon dioxide to urea synthesis was 2.5:1, reaction conditions in unit 19 were 193° C. and 204 kg./sq. cm., and an equilibrium conversion percentage of 55% was attained. The shell side temperature in unit 15 was 193° C. and tube side temperature was 170° C. The shell side of unit 6 was also at a temperature of 193° C. and steam stream 12 was generated at 4.56 kg./sq. cm. About 85% of the ammonium carbamate originally present in stream 24 was removed in unit 15. Inert gases were removed from the system by purging and scrubbing of the purge gases with condensate water, during the processing of stream 32.

I claim:

1. In a urea synthesis process in which ammonia carbon dioxide and ammonium carbamate are reacted to produce a synthesis effluent stream containing urea, ammonium carbamate, free ammonia and water, the pressure of said urea synthesis effluent stream is reduced, said urea synthesis effluent stream is heated at reduced pressure in a first heat exchange zone to decompose ammonium carbamate and form a first mixed gas stream, said first mixed gas stream is separated from a first residual liquid process stream, the pressure of said first residual liquid process stream is reduced, said first residual liquid process stream is heated at reduced pressure in a second heat exchange zone to further decompose ammonium carbamate and form a second mixed gas stream, said second mixed gas stream is separated from a second residual liquid process stream, said second residual liquid process stream is processed to produce product urea, said second mixed gas stream is compressed to the pressure level of said first mixed gas stream, the compressed second mixed gas stream is combined with said first mixed gas stream to form a combined mixed gas stream, and said combined mixed gas stream is compressed to urea synthesis pressure to form said recycle mixed gas stream, the improvement which comprises (a) adding at least a portion of said carbon dioxide feed stream to said second mixed gas stream, whereby a resulting second mixed gas stream of enriched carbon dioxide content is formed, (b) reacting at least a portion of the resulting recycle mixed gas stream with at least a portion of said ammonia feed stream, whereby ammonium carbamate is formed and heat is liberated, within said first heat exchange zone and in indirect heat exchange with said urea synthesis effluent stream, said first heat exchange zone comprising a plurality of vertically oriented passages, said urea synthesis effluent stream being passed downwards within said passages, said compressed second mixed gas stream being passed upwards within said passages whereby said synthesis effluent stream is stripped and said second mixed gas stream is combined with said first mixed gas stream, said reaction between the resulting recycle mixed gas stream and ammonia feed stream taking place external to said passges, whereby said passages are heated, and (c) passing the combined process stream formed by the mixing of said resulting recycle mixed gas stream with ammonia feed stream in accordance with step (b) to urea synthesis.

2. The process of claim 1, in which a portion of said resulting recycle mixed gas stream is reacted with a portion of said ammonia feed stream, whereby heat is liberated, in a third heat exchange zone and in indirect heat exchange with liquid water, said liquid water being vaporized to steam, said steam is withdrawn from said third heat exchange zone, and the combined process stream formed by the mixing of said recycle mixed gas stream portion with said ammonia feed stream portion is passed to urea synthesis.

3. The process of claim 1, in which urea synthesis is carried out at a pressure in the range of 150 kg./sq. cm. to 350 kg./sq. cm., the pressure of said urea synthesis effluent stream is reduced to the range of 35 kg./sq. cm. to 140 kg./sq. cm. prior to passing to said first heat exchange zone, and said first residual liquid process stream is heated in said second heat exchange zone at a pressure in the range of 3 kg./sq. cm. to 30 kg./sq. cm.

4. The process of claim 1, in which said second mixed gas stream is compressed to the pressure level of said first mixed gas stream in a first substantially adiabatic compression means, and said combined mixed gas stream is compressed to urea synthesis to form said recycle mixed gas stream in a second substantially adiabatic compression means.

5. The process of claim 1, in which said second residual liquid process stream consists essentially of aqueous urea solution.

6. The process of claim 1, in which a first mixed off-gas portion is evolved and separated from said urea synthesis effluent stream at reduced pressure, prior to the heating of said urea synthesis effluent stream in said first heat exchange zone, and said first mixed off-gas portion is added to said first mixed gas stream.

References Cited

UNITED STATES PATENTS

| 3,301,897 | 1/1967 | Cook | 260—555 |
| 3,544,628 | 12/1970 | Hsu | 260—555 |

FOREIGN PATENTS

| 958,503 | 3/1950 | France | 260—555 |

LEON ZITVER, Primary Examiner

A. SIEGEL, Assistant Examiner

U.S. Cl. X.R.

260—534 R